United States Patent
Seidel et al.

(10) Patent No.: US 6,949,596 B2
(45) Date of Patent: Sep. 27, 2005

(54) NON-INFLAMMABLE, ANTI-ELECTROSTATIC POLYCARBONATE MOLDING MATERIALS

(75) Inventors: Andreas Seidel, Dormagen (DE); Thomas Eckel, Dormagen (DE); Michael Zobel, Köln (DE); Dieter Wittmann, Leverkusen (DE); Manfred Dietrich, Frankfurt (DE)

(73) Assignee: Bayer Aktiengesellschaft, Levekrusen (DE)

( * ) Notice: Subject to any disclaimer, the term of this patent is extended or adjusted under 35 U.S.C. 154(b) by 90 days.

(21) Appl. No.: 10/296,687

(22) PCT Filed: May 21, 2001

(86) PCT No.: PCT/EP01/05779

§ 371 (c)(1),
(2), (4) Date: Nov. 26, 2002

(87) PCT Pub. No.: WO01/92418

PCT Pub. Date: Dec. 6, 2001

(65) Prior Publication Data

US 2003/0171472 A1 Sep. 11, 2003

(30) Foreign Application Priority Data

Jun. 2, 2000 (DE) .......................... 100 27 335

(51) Int. Cl.⁷ ................................. C08K 5/06
(52) U.S. Cl. .............. 524/121; 524/123; 524/124; 524/125; 524/127; 524/128; 524/368; 524/378; 524/505; 524/537
(58) Field of Search ................ 524/121, 123, 524/124, 125, 127, 128, 368, 378, 505, 537

(56) References Cited

U.S. PATENT DOCUMENTS

| | | | | |
|---|---|---|---|---|
| 3,450,794 A | | 6/1969 | Ebneth et al. ............... 260/876 |
| 4,839,421 A | | 6/1989 | Buysch et al. ................ 525/67 |
| 4,920,166 A | * | 4/1990 | Buysch et al. ............... 524/141 |
| 5,061,745 A | | 10/1991 | Wittmann et al. ........... 524/139 |
| 5,204,394 A | * | 4/1993 | Gosens et al. ............... 524/125 |
| 5,635,560 A | | 6/1997 | Köhler et al. ................. 525/67 |
| 5,672,645 A | | 9/1997 | Eckel et al. ................. 524/127 |
| 5,741,838 A | * | 4/1998 | Fuhr et al. .................. 524/127 |
| 5,849,827 A | | 12/1998 | Bödiger et al. ............. 521/423 |
| 5,952,408 A | * | 9/1999 | Lee et al. .................... 524/127 |
| 5,977,206 A | * | 11/1999 | Miya et al. .................. 523/136 |
| 6,150,443 A | | 11/2000 | Nodera et al. .............. 524/157 |
| 6,194,497 B1 | | 2/2001 | Willems et al. ............. 524/165 |
| 6,448,316 B1 | | 9/2002 | Hirano et al. ............... 524/127 |

FOREIGN PATENT DOCUMENTS

| | | |
|---|---|---|
| DE | 1 297 341 | 6/1969 |
| DE | 37 27 250 | 11/1988 |
| DE | 198 17 993 | 10/1999 |
| EP | 0 135 801 | 1/1989 |
| EP | 0 816 433 | 1/1998 |
| EP | 0 893 476 | 1/1999 |
| EP | 1 125 984 | 8/2001 |
| FR | 1239902 | 7/1960 |
| WO | 01/18117 | 3/2001 |
| WO | 01/42362 | 6/2001 |

OTHER PUBLICATIONS

English language translation DE 3331158 Mar. 1985.*
A. Lichtblau, "Antistatic Agents", Translated from Kunststoffe 86 (1996) 7, pp. 955–958, pp. 11–12.

* cited by examiner

Primary Examiner—Margaret G. Moore
(74) Attorney, Agent, or Firm—Joseph C. Gil; Aron Preis

(57) ABSTRACT

A flame resistant anti-electrostatic polycarbonate composition that is chlorine- and bromine-free is disclosed. Good melt flowability and low tendency to juicing, coupled with its good mechanical and thermal properties make the composition especially suitable for injection molding. The composition finds use in the production of a variety of molded articles.

20 Claims, No Drawings

NON-INFLAMMABLE, ANTI-ELECTROSTATIC POLYCARBONATE MOLDING MATERIALS

The present invention relates to impact-modified polycarbonate moulding compositions with antistatic properties which are provided with chlorine- and bromine-free flame resistance and are distinguished by good mechanical and thermal properties and a problem-free processability in the injection moulding process.

Impact-modified polycarbonate moulding compositions which are provided with chlorine- and bromine-free flame resistance are known.

EP-A 0 345 522 describes polymer mixtures of aromatic polycarbonate, ABS graft polymer and/or styrene-containing copolymer which are provided with flame resistance with monophosphoric acid esters.

U.S. Pat. Nos. 5,204,394 and 5,672,645 describe PC/ABS moulding compositions which are provided with flame resistance by oligophosphoric acid esters or mixtures of oligo- and monophosphoric acid esters.

JP-A 111 997 68 describes PC/ABS blends which are provided with flame resistance with monomeric and oligomeric phosphoric acid esters, the flame resistance being improved significantly by addition of an inorganic filler, such as e.g. talc.

U.S. Pat. No. 5,849,827 describes PC/ABS moulding compositions which are provided with flame resistance with resorcinol-based oligophosphate, the after-burning times being reduced significantly by addition of nanoscale inorganic materials in low concentrations. WO 99/07782 describes PC/ABS moulding compositions with a specific oligophosphate derived from bisphenol A and synergistic amounts of a nanoscale inorganic compound.

Most plastics, thus also the moulding compositions described in the patents and patent applications mentioned so far, are electrical insulators with a high surface electrical resistance. Electrical charging of the surface of the plastic, which easily arises during processing of the material, by contact with other materials or by friction, is therefore dissipated only extremely slowly and leads to diverse disturbances and trouble in practice, in particular to a rapid contamination and dusting of the components of plastic with the development of undesirable characteristic dust figures.

The surface resistance and the dust-attracting tendency of plastics can be reduced by additive treatment with so-called antistatics. Commercially available additives for anti-electrostatic treatment of plastics which are employed are, for example, alkyl- and arylsulfonates, ethoxylated alkylamines, quaternary ammonium and phosphonium salts and fatty acid esters (see e.g. A. Lichtblau, "Antistatika", Kunststoffe 86 (1996), 7, p. 955–958 and EP-A 0 897 950). The use of specific polyalkylene ethers/polyalkylene glycols for anti-electrostatic treatment of plastics is also described in the patent literature.

DE-A 1 297 341 discloses, for example, a process for antistatic treatment of polymers which are built up exclusively or predominantly from carbon and hydrogen (in particular polyethylene) by surface treatment with or incorporation of polyalkylene glycols.

FR-B-1 239 902 describes the use of ethylene oxide/propylene oxide triple-block copolymers for antistatic treatment of polymers. The triple-block copolymers are said to display their antistatic action in polymethyl methacrylate, PVC, polyethylene, polystyrene and ABS moulding compositions.

DE-A1-1 981 7993 describes ABS plastics which are provided with antistatic properties with specific triple-block copolymers of the formula X—Y—X with a central block Y of propylene oxide units and terminal blocks X of ethylene oxide units. The average content of ethylene oxide units in these triple-block copolymers here is 2 to 35 wt. %.

DE-A-1 244 398 describes the use of polypropylene glycol as an antistatic for ABS resins. However, to achieve a significant effect polypropylene glycol must be employed in large amounts (typically e.g. 5 wt. %), which can lead to flecked and smeared surfaces of the finished components up to surface deposits on the finished components of plastic and/or in the injection mould.

PC/ABS moulding compositions comprising polyalkylene ethers/polyalkylene glycols are also known.

EP-A-0 135 801 describes impact-modified polycarbonate moulding compositions which are treated with 0.1 to 3 wt. %, based on the PC/ABS matrix, of triple-block copolymers of the formula X—Y—X with a central block Y of propylene oxide units and terminal blocks X of ethylene oxide units. The effect of the triple-block copolymers which is described in this Application is to improve the processing properties of the moulding compositions in the injection moulding process, characterized by the mould release properties, flowability and weld line strength, without impairing the mechanical properties of the material.

EP-A-0 278 348 describes PC/ABS moulding compositions which are provided with antistatic properties using specific polyalkylene ethers. The polyalkylene ethers used were modified here by treatment with substances which form free radicals, which increases their efficiency as an antistatic.

The PC/ABS moulding compositions with polyalkylene ethers described in the abovementioned patent applications are indeed distinguished by anti-electrostatic properties, but are not flame-resistant in the form described. However, for many uses flame resistance is necessarily required and antistatic properties are additionally desired. Simultaneous anti-electrostatic and flame-resistant treatment of PC/ABS moulding compositions, however, proves to be extremely difficult, since the antistatics which can be used are in general readily combustible and their addition to the moulding composition is counter-productive to flame-resistant treatment thereof by making it more difficult.

EP-A-0 979 840 describes antistatic and flame-resistant polycarbonate moulding compositions which comprise an impact-modified polystyrene and are provided with flame resistance with monomeric or oligomeric phosphoric acid esters and with antistatic properties with specific sodium dodecylbenzenesulfonates. The moulding compositions can optionally also comprise, inter alia, polyalkylene glycols. Polycarbonate moulding compositions with ABS are not described here. However, because of the poorer compatibility of the polymer components, compared with PC/ABS blends, the PC/HIPS blends described in EP-A-0 979 840 prove to be problematic in respect of the flow line strength and therefore the processability in the injection moulding process, in particular in the production of thin-walled finished components of involved structure, for which several gates are necessary to achieve complete filling of the injection moulds.

U.S. Pat. No. 4,920,166 solves the problem of a simultaneous flame-resistant and antistatic treatment of PC/ABS by adding to the polymer moulding composition on the one hand polyalkylene glycols which have been reacted with agents which form free radicals, as the antistatic, and on the other hand monophosphoric acid esters as an FR additive and Teflon as an antidripping agent. Low molecular weight organic bromine compounds can optionally also additionally be employed as an FR additive. The moulding compositions described do not have an adequate heat distortion point for many uses and during processing in the injection moulding process tend markedly towards "juicing", i.e. bleeding of volatile constituents of the moulding composition (in particular the FR additive), and associated with this undesirable formation of a deposit on the injection mould surface.

The object of the present invention was to provide moulding compositions which are provided with anti-electrostatic properties and chlorine-/bromine-free flame resistance, have good mechanical and thermal properties, in particular high heat distortion points and notched impact strengths, and are distinguished by good processability in the injection moulding process, the latter requiring excellent flowability (low melt viscosity) and a low tendency towards the formation of a deposit in the mould by bleeding of volatile constituents of the moulding composition.

It has now been found that impact-modified polycarbonate compositions which comprise specific polyalkylene ethers and halogen-free phosphorus compounds of low volatility fulfil the required profile of requirements.

The present invention therefore provides polycarbonate compositions comprising aromatic polycarbonate or polyester-carbonate,
at least one impact modifier,
at least one halogen-free phosphorus compound chosen from the substance groups of oligomeric phosphoric acid esters, phosphonate-amines and phosphazenes and
a polyalkylene ether compound based on propylene oxide or based on propylene oxide and ethylene oxide, the propylene oxide content being $\geq 60$ wt. %, preferably $\geq 70$ wt. % (based on the mass of the polyalkylene ether).

The moulding compositions can optionally furthermore comprise fluorinated polyolefin,
finely divided inorganic material,
further polymer components and
further commercially available polymer additives.

Preferred moulding compositions comprise

A) 30 to 98 parts by wt., preferably 40 to 95 parts by wt., particularly preferably 50 to 90 parts by wt. of aromatic polycarbonate,
B) 0.5 to 50, preferably 1 to 35, particularly preferably 2 to 25 parts by wt. of at least one graft polymer,
C) 0.5 to 40, preferably 1 to 30, in particular 2 to 20 parts by wt. of at least one halogen-free phosphorus compound chosen from the substance groups of oligomeric phosphoric acid esters, phosphonate-amines and phosphazenes,
D) 0 to 5, preferably 0.1 to 1, in particular 0.1 to 0.5 part by wt. of fluorinated polyolefin,
E) 0 to 50 parts by wt., preferably 1 to 30 parts by wt., in particular 2 to 25 parts by wt. of vinyl (co)polymer and/or polyalkylene terephthalate,
F) 0 to 10 parts by wt., preferably 0 to 5 parts by wt., in particular 0 to 3 parts by wt. of finely divided inorganic material in the form of particles, flakes or fibres,
G) 0 to 20, preferably 0 to 10, in particular 0 to 5 parts by wt. of at least one commercially available polymer additive and
H) 0.05 to 5, preferably 0.1 to 4, in particular 0.5 to 3 parts by wt. of polyalkylene ether based on propylene oxide or based on propylene oxide and ethylene oxide, the propylene oxide content being $\geq 60$ wt. %, preferably $\geq 70$ wt. % (based on the mass of the polyalkylene ether).

The sum of the parts by weight of all the components (A to H and optionally further constituents) here is 100.

Very particularly preferred polycarbonate compositions are distinguished in that they comprise as component H polyalkylene ethers with a number-average molecular weight of $\geq 2,000$ g mol$^{-1}$, preferably $\geq 3,000$ g mol$^{-1}$, in particular $\geq 3,500$ g mol$^{-1}$.

Component A

Aromatic polycarbonates and/or aromatic polyester-carbonates according to component A which are suitable according to the invention are known from the literature or can be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396; for the preparation of aromatic polyester-carbonates e.g. DE-A 3 077 934).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the phase boundary process, optionally using chain terminators, for example monophenols, and optionally using branching agents which are trifunctional or more than trifunctional, for example triphenols or tetraphenols.

Diphenols for the preparation of the aromatic polycarbonates and/or aromatic polyester-carbonates are preferably those of the formula (I)

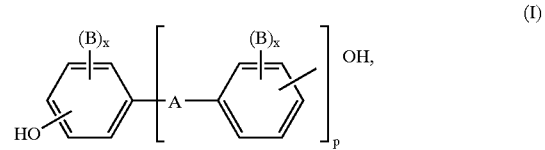

wherein

A is a single bond, $C_1$–$C_5$-alkylene, $C_2$–$C_5$-alkylidene, $C_5$–$C_6$-cycloalkylidene, —O—, —SO—, —CO—, —S—, —SO$_2$—, $C_6$–$C_{12}$-arylene, to which further aromatic rings optionally containing heteroatoms can be fused,
or a radical of the formula (II) or (III)

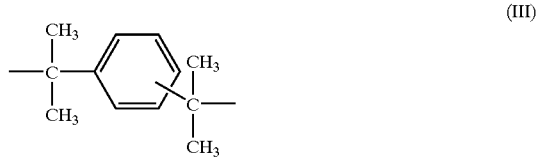

B in each case is $C_1$–$C_{12}$-alkyl, preferably methyl,
x in each case independently of one another, is 0, 1 or 2 and
p is 1 or 0, and
$R^5$ and $R^6$ can be chosen individually for each $X^1$ and independently of one another denote hydrogen or $C_1$–$C_6$-alkyl, preferably hydrogen, methyl or ethyl,
$X^1$ denotes carbon and
m denotes an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)-diisopropyl-benzenes.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide and 4,4'-dihydroxydiphenyl sulfone.

2,2-Bis-(4-hydroxyphenyl)-propane (bisphenol A) is particularly preferred.

The diphenols can be employed individually or as any desired mixtures.

The diphenols are known from the literature or are obtainable by processes known from the literature.

Suitable chain terminators for the preparation of the thermoplastic aromatic polycarbonates are, for example, phenol and p-tert-butylphenol, and also long-chain alkylphenols, such as 4-(1,3-tetramethylbutyl)-phenol according to DE-A 2 842 005 or monoalkylphenols or dialkylphenols having a total of 8 to 20 C atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the molar sum of the particular diphenols employed.

The thermoplastic aromatic polycarbonates can be branched in a known manner, and in particular preferably by incorporation of 0.05 to 2.0 mol %, based on the sum of diphenols employed, of compounds which are trifunctional or more than trifunctional, for example those with three or more phenolic groups.

Both homopolycarbonates and copolycarbonates are suitable. To prepare copolycarbonates according to the invention according to component A, 1 to 25 wt. %, preferably 2.5 to 25 wt. % (based on the total amount of diphenols to be employed), of polydiorganosiloxanes with hydroxy-aryloxy end groups can also be employed. These are known (see, for example, U.S. Pat. No. 3,419,634) or can be prepared by processes known from the literature. The preparation of copolycarbonates comprising polydiorganosiloxanes is described e.g. in DE-A 3 334 782.

Preferred polycarbonates are, in addition to the bisphenol A homopolycarbonates, the copolycarbonates of bisphenol A with up to 15 mol %, based on the molar sum of diphenols, of other diphenols mentioned as preferred or particularly preferred.

Aromatic dicarboxylic acid dihalides for the preparation of aromatic polyester-carbonates are preferably the di-acid dichlorides of isophthalic acid, terephthalic acid, diphenyl ether-4,4'-dicarboxylic acid and naphthalene-2,6-dicarboxylic acid.

Mixtures of the di-acid dichlorides of isophthalic acid and terephthalic acid in a ratio of between 1:20 and 20:1 are particularly preferred.

A carbonic acid halide, preferably phosgene, is additionally co-used as a bifunctional acid derivative in the preparation of polyester-carbonates.

Possible chain terminators for the preparation of the aromatic polyester-carbonates are, in addition to the monophenols already mentioned, also chlorocarbonic acid esters thereof and the acid chlorides of aromatic monocarboxylic acids, which can optionally be substituted by $C_1$–$C_{22}$-alkyl groups, as well as aliphatic $C_2$–$C_{22}$-monocarboxylic acid chlorides.

The amount of chain terminators is in each case 0.1 to 10 mol %, based on the moles of diphenols in the case of the phenolic chain terminators and on the moles of dicarboxylic acid dichlorides in the case of monocarboxylic acid chloride chain terminators.

The aromatic polyester-carbonates can also comprise incorporated aromatic hydroxycarboxylic acids.

The aromatic polyester-carbonates can be either linear or branched in a known manner (for this see also DE-A 2 940 024 and DE-A 3 007 934).

Branching agents which can be used are, for example, carboxylic acid chlorides which are 3-functional or more than 3-functional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol % (based on the dicarboxylic acid dichlorides employed), or phenols which are 3-functional or more than 3-functional, such as phloroglucinol, 4,6-dimethyl-2,4,6-tri-(4-hydroxyphenyl)-heptene, 2,4,4-trimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane or 1,4-bis[4,4'-dihydroxytri-phenyl)-methyl]-benzene, in amounts of 0.01 to 1.0 mol %, based on the diphenols employed. Phenolic branching agents can be initially introduced into the reaction vessel with the diphenols, and acid chloride branching agents can be introduced together with the acid dichlorides.

The content of carbonate structural units in the thermoplastic aromatic polyester-carbonates can vary as desired. The content of carbonate groups is preferably up to 100 mol %, in particular up to 80 mol %, particularly preferably up to 50 mol %, based on the sum of ester groups and carbonate groups. Both the ester and the carbonate content of the aromatic polyester-carbonates can be present in the polycondensate in the form of blocks or in random distribution.

The relative solution viscosity ($\eta_{rel}$) of the aromatic polycarbonates and polyester-carbonates is in the range from 1.18 to 1.4 (measured on solutions of 0.5 g polycarbonate or polyester-carbonate in 100 ml methylene chloride solution at 25° C.).

The thermoplastic aromatic polycarbonates and polyester-carbonates can be employed by themselves or in any desired mixture with one another.

Component B

Component B comprises one or more graft polymers of

B.1 5 to 95, preferably 30 to 90 wt. % of at least one vinyl monomer on

B.2 95 to 5, preferably 70 to 10 wt. % of one or more graft bases with glass transition temperatures of <10° C., preferably <0° C., particularly preferably <−20° C.

The graft base B.2 in general has an average particle size ($d_{50}$ value) of 0.05 to 10 μm, preferably 0.1 to 5 μm, particularly preferably 0.2 to 1 μm.

Monomers B. 1 are preferably a mixture of

B.1.1 50 to 99 parts by wt. of vinylaromatics and/or vinylaromatics substituted on the nucleus (such as, for example and preferably, styrene, α-methylstyrene and p-methylstyrene) and/or methacrylic acid ($C_1$–$C_8$)-alkyl esters (such as, for example and preferably, methyl methacrylate and ethyl methacrylate) and B.1.2 1 to 50 parts by wt. of vinyl cyanides (unsaturated nitriles, such as, for example and preferably, acrylonitrile and methacrylonitrile) and/or (meth)acrylic acid ($C_1$–$C_8$)-alkyl esters (such as, for example and preferably, methyl methacrylate, n-butyl acrylate and t-butyl acrylate) and/or derivatives (such as, for example and preferably, anhydrides and imides) of unsaturated carboxylic acids (for example and preferably maleic anhydride and N-phenylmaleimide).

Preferred monomers B.1.1 are chosen from at least one of the monomers styrene, α-methylstyrene and methyl methacrylate, and preferred monomers B.1.2 are chosen from at least one of the monomers acrylonitrile, maleic anhydride and methyl methacrylate.

Particularly preferred monomers are B.1.1 styrene and B.1.2 acrylonitrile.

Graft bases B.2 which are suitable for graft polymers B are, for example, diene rubbers, EP(D)M rubbers, that is to say those based on ethylene/propylene and optionally diene, and acrylate, polyurethane, silicone and ethylene/vinyl acetate rubbers.

Preferred graft bases B.2 are diene rubbers (e.g. based on butadiene, isoprene etc.) or mixtures of diene rubbers or copolymers of diene rubbers or mixtures thereof with further copolymerizable monomers (e.g. according to B.1.1 and B.1.2), with the proviso that the glass transition temperature of component B.2 is below <10° C., preferably <0° C., particularly preferably <–10° C.

Pure polybutadiene rubber is particularly preferred.

Particularly preferred polymers B are ABS polymers (emulsion, bulk and suspension ABS) such as are described e.g. in DE-A 2 035 390 (=U.S. Pat. No. 3,644,574) or in DE-A 2 248 242 (=GB-A 1 409 275) and in Ullmann, Enzyklopädie der Technischen Chemie, vol. 19 (1980), p. 280 et seq. The gel content of graft base B.2 is in general at least 30 wt. %, preferably at least 40 wt. % (measured in toluene).

Graft copolymers B can be prepared by free-radical polymerization, e.g. by emulsion, suspension, solution or bulk polymerization, preferably by emulsion or bulk polymerization.

Emulsion ABS and bulk ABS are particularly preferred as component B.

Suitable graft rubbers are, in particular, also those ABS polymers which are prepared by redox initiation with an initiator system of organic hydroperoxide and ascorbic acid in accordance with U.S. Pat. No. 4,937,285.

Suitable acrylate rubbers according to B.2 of polymers B are preferably polymers of acrylic acid alkyl esters, optionally with up to 40 wt. %, based on B.2, of other polymerizable, ethylenically unsaturated monomers. Preferred polymerizable acrylic acid esters include $C_1$–$C_8$-alkyl esters, for example the methyl, ethyl, butyl, n-octyl and 2-ethylhexyl ester, and mixtures of these monomers.

For crosslinking, monomers with more than one polymerizable double bond can be copolymerized. Preferred examples of crosslinking monomers are esters of unsaturated monocarboxylic acids having 3 to 8 C atoms and unsaturated monohydric alcohols having 3 to 12 C atoms or saturated polyols having 2 to 4 OH groups and 2 to 20 C atoms, such as e.g. ethylene glycol dimethacrylate and allyl methacrylate; polyunsaturated heterocyclic compounds, such as e.g. trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds which contain at least 3 ethylenically unsaturated groups.

Particularly preferred crosslinking monomers are the cyclic monomers triallyl cyanurate, triallyl isocyanurate, triacryloylhexahydro-s-triazine and triallylbenzenes. The amount of crosslinking monomers is preferably 0.02 to 5, in particular 0.05 to 2 wt. %, based on graft base B.2.

In the case of cyclic crosslinking monomers with at least 3 ethylenically unsaturated groups, it is advantageous to limit the amount to less than 1 wt. % of graft base B.2.

Preferred "other" polymerizable, ethylenically unsaturated monomers which can optionally be used for the preparation of graft base B.2, in addition to the acrylic acid esters, are e.g. acrylonitrile, styrene, α-methylstyrene, acrylamides, vinyl $C_1$–$C_6$-alkyl ethers, methyl methacrylate and butadiene. Preferred acrylate rubbers as graft base B.2 are emulsion polymers which have a gel content of at least 60 wt. %.

Further suitable graft bases according to B.2 are silicone rubbers with grafting-active sites, such as are described in DE-A 3 704 657, DE-A 3 704 655, DE-A 3 631 540 and DE-A 3 631 539.

The gel content of graft base B.2 is determined at 25° C. in a suitable solvent (M. Hoffmann, H. Krömer, R. Kuhn, Polymeranalytik I and II, Georg Thieme-Verlag, Stuttgart 1977).

The average particle size $d_{50}$ is the diameter above and below which in each case 50 wt. % of the particles lie. It can be determined by means of ultracentrifuge measurement (W. Scholtan, H. Lange, Kolloid, Z. und Z. Polymere 250 (1972), 782–1796).

Component C

The moulding compositions according to the invention comprise as flameproofing agent (C) at least one halogen-free phosphorus compound of low volatility.

Preferred phosphorus compounds are those of the general formula (IV)

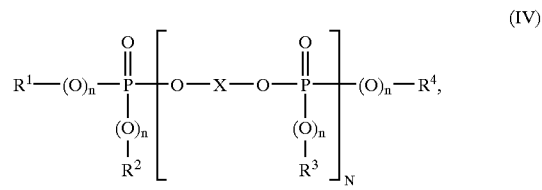

(IV)

wherein $R^1$, $R^2$, $R^3$ and $R^4$ independently of one another in each case denote $C_1$- to $C_8$-alkyl, or $C_5$- to $C_6$-cycloalkyl, $C_6$- to $C_{20}$-aryl or $C_7$- to $C_{12}$-aralkyl, in each case optionally substituted by alkyl, preferably $C_1$–$C_4$-alkyl, n independently of one another, denotes 0 or 1, N denotes a number between 0.5 and 30 and X denotes a mono- or polynuclear aromatic radical having 6 to 30 C atoms or a linear or branched aliphatic radical having 2 to 30 C atoms, which can be OH-substituted and can contain up to 8 ether bonds.

Preferably, $R^1$, $R^2$, $R^3$ and $R^4$ independently of one another represent $C_1$–$C_4$-alkyl, phenyl, naphthyl or phenyl-$C_1$–$C_4$-alkyl. The aromatic groups $R^1$, $R^2$, $R^3$ and $R^4$ can in their turn be substituted by alkyl groups, preferably $C_1$–$C_4$-alkyl. Particularly preferred aryl radicals are cresyl, phenyl, xylenyl, propylphenyl or butylphenyl.

X in the formula (IV) preferably denotes a mono- or polynuclear aromatic radical having 6 to 30 C atoms. This is preferably derived from diphenols of the formula (I). In particular, X represents

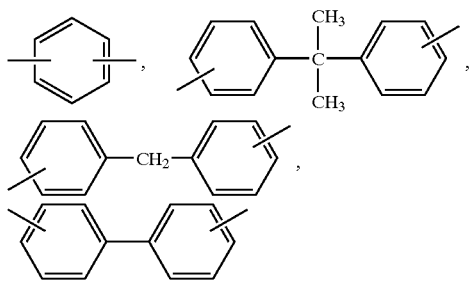

n in the formula (IV) is preferably 1.
N can assume values from 0.5 to 30, preferred values are from 0.5 to 10, in particular 0.7 to 5. Mixtures of different phosphates according to formula (IV) can also be employed as component C according to the invention. In this case N can assume the abovementioned values as average values. The mixtures can also comprise monophosphorus compounds (N=0).

Monophosphorus compounds of the formula (IV) are, in particular, tributyl phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, methylphosphonic acid dimethyl ester, methylphosphonic acid diphenyl ester, phenylphosphonic acid diethyl ester, triphenylphosphine oxide or tricresylphosphine oxide. Triphenyl phosphate is a particularly preferred monophosphorus compound.

The average N values can be determined by determining the composition of the phosphate mixture (molecular weight distribution) by means of suitable methods (gas chromatography (GC), high pressure liquid chromatography (HPLC), gel permeation chromatography (GPC)) and calculating the mean values for N therefrom.

The use of phosphorus compounds of the general formula (V)

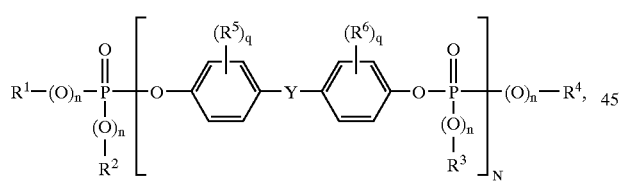

wherein
$R^1$, $R^2$, $R^3$ and $R^4$ in each case independently of one another denote $C_1$–$C_8$-alkyl and/or optionally alkyl-substituted $C_5$–$C_6$-cycloalkyl, $C_6$–$C_{10}$-aryl or $C_7$–$C_{12}$-aralkyl,
n independently of one another, denotes 0 or 1, preferably 1,
q independently of one another, denotes 0, 1, 2, 3 or 4, preferably 0, 1 or 2,
N denotes a number between 0.5 and 30, preferably between 0.5 and 10, in particular between 0.7 and 5,
$R^5$ and $R^6$ independently of one another denote $C_1$–$C_4$-alkyl, preferably methyl, and
Y denotes $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, $SO_2$ or —CO—,
also proves to be particularly advantageous.

Those compounds of the general formula (V) which are derived from bisphenol A or methyl-substituted derivatives thereof are particularly preferred.

The phosphorus compounds according to the general formula (IV) are known (cf. e.g. EP-A 363 608 and EP-A 640 655) or can be prepared by known methods in an analogous manner (e.g. Ullmanns Encyklopädie der technischen Chemie, vol. 18, p. 301 et seq. 1979; Houben-Weyl, Methoden der organischen Chemie, vol. 12/1, p. 43; and Beilstein vol. 6, p. 177).

Other halogen-free phosphorus compounds of low volatility can also be employed as flameproofing component (C), and in particular either by themselves or in any desired mixture with compounds of the general formula (IV). Possible such halogen-free phosphorus compounds are, in particular, compounds from the group consisting of phosphazenes and phosphonate-amines.

Phosphonate-amines are compounds of the formula (VI)

$$A_{3-y}\text{-}NB^1_y \qquad (VI)$$

in which
A represents a radical of the formula (VIa)

or (VIb)

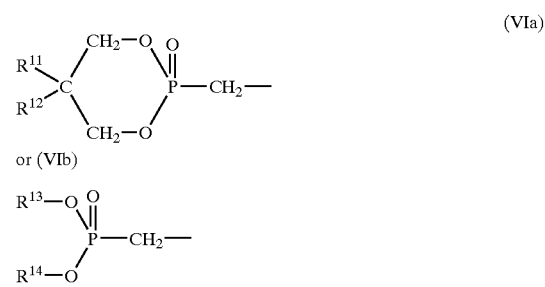

$R^{11}$ and $R^{12}$ independently of one another represent $C_1$–$C_{10}$-alkyl or represent unsubstituted or substituted $C_6$–$C_{10}$-aryl,
$R^{13}$ and $R^{14}$ independently of one another represent $C_1$–$C_{10}$-alkyl or unsubstituted or substituted $C_6$–$C_{10}$-aryl,
y denotes the numerical values 0, 1 or 2 and
$B^1$ independently represents hydrogen, $C_2$–$C_8$-alkyl or unsubstituted or substituted $C_6$–$C_{10}$-aryl.
$B^1$ independently preferably represents hydrogen, ethyl, n- or iso-propyl or unsubstituted or $C_1$–$C_4$-alkyl-substituted $C_6$–$C_{10}$-aryl, in particular phenyl or naphthyl.
Alkyl in $R^{11}$, $R^{12}$, $R^{13}$ and $R^{14}$ independently preferably represents methyl, ethyl, n-propyl, iso-propyl, n-, iso-, sec- or tert-butyl, pentyl or hexyl.
$C_6$–$C_{10}$-Aryl in $R^{11}$, $R^{12}$, $R^{13}$ and $R^{14}$ independently preferably represents phenyl, naphthyl or binaphthyl.
5,5,5',5',5",5"-Hexamethyltris(1,3,2-dioxaphosphorinane-methane)amino-2,2',2"-trioxide of the formula (VI-a-1)

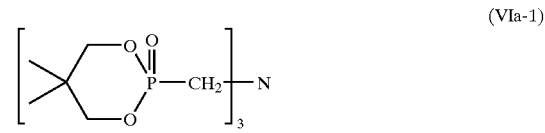

(test product XPM 1000 of Solutia Inc., St. Louis, USA) may be mentioned by way of example and as preferred.

The preparation of the phosphonate-amines is described, for example, in U.S. Pat. No. 5,844,028.

Phosphazenes are compounds of the formulae (VIIa) and/or (VIIb)

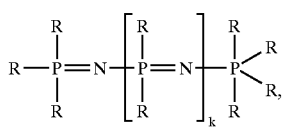
(VIIa)

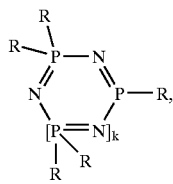
(VIIb)

wherein

R is in each case identical or different and represents $C_1$- to $C_6$-alkyl or $C_1$–$C_8$-alkoxy, or $C_5$- to $C_6$-cycloalkyl, $C_6$- to $C_{20}$-aryl, preferably phenyl or naphthyl, $C_6$- to $C_{20}$-aryloxy, preferably phenoxy or naphthyloxy, or $C_7$- to $C_{12}$-aralkyl, preferably phenyl-$C_1$–$C_4$-alkyl, in each case optionally substituted by alkyl, preferably $C_1$–$C_4$-alkyl, and k represents 0 or a number from 1 to 15, preferably a number from 1 to 10.

There may be mentioned by way of example and as preferred: propoxyphosphazene, phenoxyphosphazene and methylphenoxyphosphazene.

Phenoxyphosphazene is particularly preferred.

Phosphazenes and their preparation are described, for example, in EP-A 728 811, DE-A-1 961668 and WO 97/40092.

Component D

The compositions according to the invention can also comprise fluorinated polyolefins as antidripping agents as component D.

Fluorinated polyolefins are generally known (cf. e.g. EP-A 640 655). A commercially available product is, for example, Teflon® 30 N from DuPont.

The fluorinated polyolefins can be employed either in the pure form or in the form of a coagulated mixture of emulsions of the fluorinated polyolefins with emulsions of graft polymers (B) or with an emulsion of a copolymer, preferably based on styrene/acrylonitrile, the fluorinated polyolefin being mixed as an emulsion with an emulsion of the graft polymer or copolymer and the mixture then being coagulated.

The fluorinated polyolefins can furthermore be employed as a precompound with graft polymer (B) or a copolymer based on, preferably, styrene/acrylonitrile. The fluorinated polyolefins are mixed as a powder with a powder or granules of the graft polymer or copolymer and the mixture is compounded in the melt, in general at temperatures of 200 to 330° C., in conventional units, such as internal kneaders, extruders or twin-shaft screws.

The fluorinated polyolefins can also be employed in the form of a masterbatch, which is prepared by emulsion polymerization of at least one monoethylenically unsaturated monomer in the presence of an aqueous dispersion of the fluorinated polyolefin. Preferred monomer components are styrene, acrylonitrile and mixtures thereof. The polymer is employed as a free-flowing powder, after acid precipitation and subsequent drying.

The coagulates, precompounds and masterbatches conventionally have solids contents of fluorinated polyolefin of 5–95 wt. %, preferably 7 to 60 wt. %.

Component E

The compositions according to the invention can also comprise further polymers or mixtures of polymers as component (E).

Suitable polymers are, preferably vinyl (co)polymers (E.1) of at least one monomer from the group consisting of vinylaromatics, vinyl cyanides (unsaturated nitriles), (meth) acrylic acid ($C_1$–$C_8$)-alkyl esters, unsaturated carboxylic acids and derivatives (such as anhydrides and imides) of unsaturated carboxylic acids. Particularly suitable polymers are (co)polymers of E.1.1 50 to 99, preferably 60 to 90 parts by wt. of vinylaromatics and/or vinylaromatics substituted on the nucleus (such as, for example and preferably, styrene, cc-methylstyrene and p-methylstyrene) and/or methacrylic acid ($C_1$–$C_8$)-alkyl esters (such as, for example and preferably, methyl methacrylate and ethyl methacrylate) and E.1.2 1 to 50, preferably 10 to 40 parts by wt. of vinyl cyanides (unsaturated nitriles), such as, for example and preferably, acrylonitrile and methacrylonitrile, and/or (meth)acrylic acid ($C_1$–$C_8$)-alkyl esters (such as, for example and preferably, methyl methacrylate, n-butyl acrylate and t-butyl acrylate) and/or unsaturated carboxylic acids (such as maleic acid) and/or derivatives (such as anhydrides and imides) of unsaturated carboxylic acids (for example and preferably maleic anhydride and N-phenyl-maleimide).

(Co)polymers E.1 are resinous, thermoplastic and rubber-free.

Copolymers of E.1.1 styrene and E.1.2 acrylonitrile are particularly preferred.

The (co)polymers according to E.1 are known and can be prepared by free-radical polymerization, in particular by emulsion, suspension, solution or bulk polymerization. The (co)polymers according to component E.1 preferably have molecular weights $M_w$ (weight-average, determined by light scattering or sedimentation) of between 15,000 and 200,000.

Polyalkylene terephthalates (E.2) such as are described in EP-A-841 187 are furthermore suitable.

Polyalkylene terephthalates which have been prepared from terephthalic acid and/or reactive derivatives thereof (e.g. dialkyl esters thereof) and ethylene glycol and/or butane-1,4-diol, and also mixtures of these polyalkylene terephthalates are preferred.

Component F

Inorganic materials, in particular those which lead to an improvement in the flame resistance of the polycarbonate moulding compositions in low concentrations, can moreover be added to the polycarbonate composition. All finely ground inorganic materials are possible in principle. These can have e.g. a particle-, flake- or fibre-like character. Examples which may be mentioned at this point are chalk, quartz powder, titanium dioxide, silicates/aluminosilicates, such as e.g. talc, wollastonite, mica/clay stratum minerals, montmorillonite, in particular also in an organophilic form modified by ion exchange, kaolin, zeolites and vermiculite, as well as aluminium oxide, silica, magnesium hydroxide, aluminium hydroxide and glass fibres/glass flakes. Mixtures of various inorganic materials can also be employed.

The inorganic materials can be surface-treated, e.g. silanized, in order to ensure better compatibility with the polymers.

The inorganic materials are employed in concentrations of 0 to 10 wt. %, preferably 0 to 5 wt. %, in particular 0 to 3 wt. %, based on the total composition.

Inorganic materials with a flake-like character are preferably employed, such as e.g. talc, mica/clay stratum minerals, montmorillonite, in particular also in an organophilic form modified by ion exchange, kaolin and vermiculite.

Talc is particularly preferred.

Talc is understood as meaning a naturally occurring or synthetically prepared talc.

Pure talc has the chemical composition 3 MgO·4SiO$_2$·H$_2$O and thus has an MgO content of 31.9 wt. %, an SiO$_2$ content of 63.4 wt. % and a content of chemically bonded water of 4.8 wt. %. It is a silicate with a laminar structure.

Naturally occurring talc materials in general do not have the abovementioned ideal composition, since they are contaminated by partial replacement of the magnesium by other elements, by partial replacement of silicon by e.g. aluminium and/or by fusions with other minerals, such as e.g. dolomite, magnesite and chlorite. These contaminated naturally occurring talc powders can also be employed in the moulding compositions according to the invention, but talc types of high purity are preferred. These are characterized by an MgO content of 28 to 35 wt. %, preferably 30 to 33 wt. %, particularly preferably 30.5 to 32 wt. %, and an SiO$_2$ content of 55 to 65 wt. %, preferably 58 to 64 wt. %, particularly preferably 60 to 62.5 wt. %. Preferred talc types are furthermore distinguished by an Al$_2$O$_3$ content of less than 5 wt. %, particularly preferably less than 1 wt. %, in particular less than 0.7 wt. %.

The use of talc in the form of finely ground types with an average maximum particle size $d_{50}$ of <20 μm, preferably <10 μm, particularly preferably <5 μm, very particularly preferably <2.5 μm is advantageous in particular.

As preferred inorganic components there may furthermore be mentioned very finely divided (nanoscale) inorganic compounds of one or more metals of main groups 1 to 5 or sub-groups 1 to 8 of the periodic table, preferably of main groups 2 to 5 or sub-groups 4 to 8, particularly preferably of main groups 3 to 5 or sub-groups 4 to 8, with the elements oxygen, sulfur, boron, phosphorus, carbon, nitrogen, hydrogen and/or silicon.

Preferred compounds are, for example, oxides, hydroxides, hydrated/basic oxides, sulfates, sulfites, sulfides, carbonates, carbides, nitrates, nitrites, nitrides, borates, silicates, phosphates and hydrides.

Particularly preferred very finely divided inorganic compounds are, for example, TiN, TiO$_2$, SnO$_2$, WC, ZnO, Al$_2$O$_3$, AlO(OH), ZrO$_2$, SiO$_2$, iron oxides, BaSO$_4$, vanadium oxides, zinc borate and silicates, such as Al silicates and Mg silicates. Mixtures and/or doped compounds can also be used. These nanoscale particles can be modified on the surface with organic molecules.

Nanoscale AlO(OH) is particularly preferred.

The average particle diameters of the nanoscale inorganic materials are less than 200 nm, preferably less than 150 nm, in particular 1 to 100 nm.

Particle size and particle diameter always means the average particle diameter $d_{50}$, determined by ultracentrifuge measurements by the method of W. Scholtan et al., Kolloid-Z. und Z. Polymere 250 (1972), p. 782 to 796.

The nanoscale inorganic compounds can be in the form of powders, pastes, sols, dispersions or suspensions. Powders can be obtained by precipitation from dispersions, sols or suspensions.

Component G

The moulding compositions according to the invention can moreover comprise conventional polymer additives, such as e.g. antidripping agents which differ from component (D), flameproofing agents which differ from component (C), lubricants and mould release agents, nucleating agents, antistatics which differ from component H, stabilizers, dyestuffs and pigments and fillers and reinforcing substances in an active concentration.

Component H

The moulding compositions according to the invention comprise as the antistatic at least one polyalkylene ether of the general formula (VIII)

$$R_1\text{—}O\text{—}(C_xH_{2x}O)_n\text{—}R_2 \quad\quad (VIII)$$

In formula (VIII)

R$_1$ and R$_2$ independently of one another represent hydrogen, a saturated or unsaturated hydrocarbon radical or an acyl radical, x represents the numbers 2 or 3, wherein x can assume different values in the same molecule and the content of monomers where x=3 is 60 to 100 wt. %, preferably 70 to 100 wt. %, based on the mass of the antistatic according to component H, and n represents a number which is chosen such that the average molecular weight of the polyalkylene ether (determined by measurement of the OH number) is ≧2,000 g mol$^{-1}$, preferably ≧3,000 g mol$^{-1}$, in particular ≧3,500 g mol$^{-1}$.

In polyalkylene ethers of the formula (VIII) which simultaneously contain monomer units where x=2 and x=3, that is to say both ethylene oxide and propylene oxide units, these can be arranged in the polyalkylene ether chain both in random distribution and in blocks of pure polyethylene oxide, pure polypropylene oxide and/or randomly mixed polyethylene-propylene oxide. Linear triple-block copolymers which are built up from homopolymer blocks are preferred.

As comonomer units polymerized-in the polyalkylene ethers can additionally contain: diols and alcohols of higher functionality, e.g. glycerol, neopentylglycol and butanediol, and/or aromatic diphenols, such as are described in the case of formula (I), e.g. bisphenol A, resorcinol and hydroquinone.

Preferred polyalkylene ethers are pure polypropylene oxides or triple-block copolymers of the general formula X—Y—X with a central polypropylene oxide block Y and terminal polyethylene oxide blocks X. The content of the two terminal polyethylene oxide blocks X taken together in the triple-block copolymer can be 0 to 40, preferably 0 to 30, in particular 0 to 20 wt. %, based on the mass of the block copolymer. The content of the central polypropylene oxide block Y is accordingly 60 to 100, preferably 70 to 100, in particular 80 to 100 wt. %. The triple-block copolymers are prepared in a manner known per se by polymerization, wherein a central polypropylene oxide block Y is first prepared and in each case a block of ethylene oxide units is added on to its two ends (see e.g. N. Schönfeld, Grenzflaichenaktive Ethylenoxid-Addukte, Wissenschaftliche Verlagsgesellschaft mbH, Stuttgart, 1976, pages 53 et seq.). Preferred triple-block copolymers and their preparation are also described in EP-A-0 135 801 and EP-A-0 018 591.

To intensify their antistatic action, the polyalkylene ethers employed as component (H) can also be reacted with agents which form free radicals in accordance with the process described in EP-A-0 278 348 and U.S. Pat. No. 4,920,166. Possible substances which form free radicals are the commercially available compounds known as initiators for free-radical polymerization, and all other compounds which dissociate to form free radicals sufficiently rapidly at temperatures of between 20 and 200° C. Thus, for example, it is possible to employ diacyl peroxides, such as dibenzoyl peroxide, substituted dibenzoyl peroxides and dilauroyl peroxide, acylsulfonyl peroxides, such as acetylcyclohexanesulfonyl peroxide, peroxydicarbonates, such as dicyclohexyl and di-tert-butyl peroxydicarbonate, acyl peresters, such as tert-butyl perpivalate and tert-butyl perbenzoate, dialkyl peroxides, such as dicumyl and di-tert-butyl peroxide, hydroperoxides, such as cumyl hydroperoxide and tert-butyl hydroperoxide, and other peroxy compounds, as well as aliphatic and araliphatic azo compounds. Preferred agents which form free radicals dissociate sufficiently rapidly at temperatures of 60 to 140° C., e.g. azodiisobutyronitrile, di-tert-butyl peroxide, dibenzoyl peroxide, tert-butyl perbenzoate, dicumyl peroxide and 1,3-bis-(tert-butylperoxyisopropyl)benzene. Dibenzoyl peroxide is particularly preferably used.

The polyalkylene ethers according to the invention modified by reaction with agents which form free radicals can be prepared by simply stirring the agent which forms free radicals with the particular polyalkylene ether at temperatures of between 50 and 150° C. The amount of agent which forms free radicals employed here, based on the amount of polyalkylene ether, is 0.05 to 5 wt. %, preferably 0.1 to 2.0 wt. % and particularly preferably 0.25 to 1.0 wt. %.

Because of their relatively low plasticizer action and their relatively low volatility, but not because of their relatively high efficiency as an antistatic, those polyalkylene ethers with a number-average molecular weight of $\geq 2,000$ g mol$^{-1}$, preferably $\geq 3,000$ g mol$^{-1}$, in particular $\geq 3,500$ g mol$^{-1}$ are preferably employed.

The moulding compositions according to the invention comprising components A to H and optionally further additives are prepared by mixing the particular constituents in a known manner and subjecting the mixture to melt compounding or melt extrusion at temperatures of 200° C. to 300° C. in conventional units, such as internal kneaders, extruders and twin-shaft screws.

The mixing of the individual constituents can be carried out in a known manner both successively and simultaneously, and in particular both at about 20° C. (room temperature) and at a higher temperature.

On the basis of their excellent flame resistance, their good mechanical and thermal properties and on the basis of their good processing properties, the thermoplastic moulding compositions according to the invention are suitable for the production of all types of shaped articles. The shaped articles can in principle be prepared by all known processes, e.g. by injection moulding and extrusion. The moulding compositions are preferably suitable for the production of shaped articles in the injection moulding process.

Preferred examples of shaped articles which can be produced are: housing components of all types, e.g. for domestic appliances, such as juice presses, coffee machines and mixers; for electric motors, such as in lawnmowers, drilling machines etc., and for office machines, such as monitors, (portable) computers, printers and copiers. Further possible fields of use are mouldings, extruded profiles or sheets for the motor vehicle/railway vehicle/aircraft sector (e.g. interior linings). The moulding compositions can also be employed for uses in electrical engineering, e.g. for switches, sockets and circuit boards, and for distributor and electricity meter boxes.

The invention also provides processes for the preparation of the moulding compositions according to the invention, their use for the production of shaped articles of all types and these shaped articles themselves.

EXAMPLES

Component A.1
Polycarbonate based on bisphenol A with a relative solution viscosity of 1.25, measured in methylene chloride at 25° C. and in a concentration of 0.5 g/100 ml.

Component A.2
Polycarbonate based on bisphenol A with a relative solution viscosity of 1.24, measured in methylene chloride at 25° C. and in a concentration of 0.5 g/100 ml.

Component B
Graft polymer prepared by emulsion polymerization of 45 parts by wt. styrene and acrylonitrile in a weight ratio of 72:28 on 55 parts by wt. of a particulate crosslinked polybutadiene rubber (average particle diameter $d_{50}=0.3$ to 0.4 µm).

Component C.1
Resorcinol-based oligophosphate

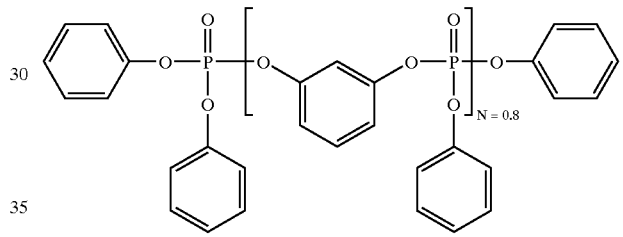

Component C.2
Bisphenol A-based oligophosphate

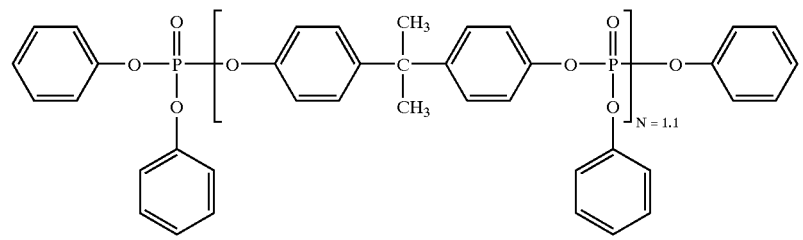

For determination of the number-average N values stated for components C.1 and C.2, the contents of the oligomeric phosphates were first determined by HPLC measurements:

| Column type: | LiChrosorp RP-8 |
| Eluent in gradient: | acetonitrile/water 50:50 to 100:0 |
| Concentration: | 5 mg/ml |

The number-weighted N mean values were then calculated from the contents of the individual components (mono- and oligophosphate) by known methods.

Component D
The polytetrafluoroethylene preparation (D) used here is prepared by coprecipitation of a mixture of aqueous emulsions of graft polymer (B) and a tetrafluoroethylene polymer. The weight ratio of graft polymer (B) to tetrafluoroethylene polymer in the coagulate is 90 wt. % to 10 wt. %. The tetrafluoroethylene polymer emulsion has a solids content of 60 wt. %, and the average PTFE particle diameter is between 0.05 and 0.5 μm. The graft polymer emulsion has a solids content of 34 wt. % and an average latex particle diameter of 0.3 to 0.4 μm.

To prepare (D), the emulsion of the tetrafluoroethylene polymer (Teflon 30 N from DuPont) is mixed with the emulsion of graft polymer (B) and the mixture is stabilized with 1.8 wt. %, based on the polymer solid, of phenolic antioxidants. The mixture is coagulated with an aqueous solution of $MgSO_4$ (Epsom salt) and acetic acid at pH 4 to 5 at 85 to 95° C. and filtered, and the residue is washed until practically free from electrolytes, subsequently freed from most of the water by centrifugation and then dried at 100° C. to give a powder.

Component E

Styrene/acrylonitrile copolymer with a styrene/acrylonitrile weight ratio of 72:28 and a limiting viscosity of 0.55 dl/g (measurement in dimethylformamide at 20° C.).

Component F.1

Pural 200: nanoscale AlO(OH) with a boehmite structure from Condea Chemie GmbH (Hamburg, Germany).

Component F.2

Naintsch A3: very finely ground highly pure talc from Naintsch Mineralwerke GmbH (Graz, Austria).

Component G.1

Phosphite stabilizer

Component G.2

Pentaerythritol tetrastearate as a mould release agent

Component H.1

Block copolymer with the structure X—(XY)—Y—(XY)—X with a central polypropylene oxide block Y, randomly mixed propylene oxide/ethylene oxide blocks (XY) adjacent thereto and terminal polyethylene oxide blocks X. The propylene oxide content of the block copolymer is 51 wt. %; the number-average molecular weight is approx. 2,000 g mol$^{-1}$ (OH number=58).

Component H.2

Modified linear polypropylene glycol: To prepare component H.2, 1.0 kg of a linear polypropylene glycol with a number-average molecular weight of approx. 2,000 g mol$^{-1}$ (OH number=56) is degassed in vacuo at 120° C. and subsequently saturated with nitrogen. After addition of 6.6 g dibenzoyl peroxide at a temperature of <40° C., the resulting mixture is reacted under nitrogen for 8 hours at 80–85° C.

Component H.3

Triple-block copolymer with the structure X—Y—X with a central polypropylene oxide block Y and terminal polyethylene oxide blocks X. The propylene oxide content of the block copolymer is 70.3 wt. %; the number-average molecular weight is approx. 4,000 g mol$^{-1}$ (OH number=29).

Component H.4

Triple-block copolymer with the structure X—Y—X with a central polypropylene oxide block Y and terminal polyethylene oxide blocks X. The propylene oxide content of the block copolymer is 86.7 wt. %; the number-average molecular weight is approx. 4,000 g mol$^{-1}$ (OH number=27).

Preparation and Testing of the Moulding Compositions According to the Invention

Components A to H were mixed with a 3 1 internal kneader or in the case of examples 8–10 and comparison example V6 with a laboratory extruder (ZSK 25, Werner & Pfleiderer) at a material temperature of 240° C., a throughput of 15 kg/h and a screw rotation frequency of 200 rpm. The shaped articles were produced on an injection moulding machine (type Arburg 270E) at 240° C.

The notched impact strength ($a_k$) is determined at room temperature in accordance with ISO 180-1A.

The Vicat B 120 temperature is determined in accordance with ISO 306 at a heating up rate of 120 K/h and a stamp load of 50 N.

The flame resistance is determined in accordance with UL94V, evaluated on bars with a thickness of 1.6 mm. A flame-resistant material in the context of the present invention exists if the UL94V test at a wall thickness of 1.6 mm is passed with the rating V-0 or V-1.

The melt viscosity, as a measure of the flowability during processing in the injection moulding process, is determined in accordance with DIN 54811 at 260° C. and at a shear rate of 1,000 s$^{-1}$.

The MVR is determined in accordance with ISO 1133 at 240° C. using a stamp load of 5 kg.

The tendency of the plastic towards juicing during injection moulding is evaluated with the aid of the results of a TGA analysis. For this, approx. 2.5 mg of the moulding compositions compounded as described above are heated up dynamically in a stream of nitrogen (50 ml/min) at a rate of 10 K/min, starting from room temperature. The percentage weight loss determined at a temperature of 280° C. reached serves as a measure of the tendency towards bleeding of volatile constituents of the moulding composition.

The antistatic properties of the materials are evaluated with the aid of a dust attraction test. For this, circular sheets with a diameter of 80 mm and a thickness of 2 mm are injection moulded using a surface-polished injection mould and immediately thereafter packed individually in bags of glassine paper. The injection moulding and testing are separated by a time span of at least one week. In test 1 the circular sheet is taken out of the paper bag. The surface of the plastic is electrically charged by the friction which arises as a result. Immediately after removal from the bag the circular sheet is kept for 10 s in an air atmosphere containing active charcoal dust and is then evaluated visually. In test 2 the circular sheet is first conditioned for 24 h at 23° C. and at a relative atmospheric humidity of 80% after removal from the paper bag and before the exposure to dust by the method described above. The active charcoal dust atmosphere is established in a defined manner in that in a 3 1 glass beaker which contains about 50 g active charcoal dust (Riedel de Haen, Seelze, Germany) and a magnetic stirrer core of suitable geometry, the dust is swirled up with a magnetic stirrer. In each case on the one hand the amount of charcoal dust deposited is evaluated both visually and gravimetrically and on the other the appearance of particularly undesirable, non-uniform dust patterns ("dust figures") is evaluated visually. The visual evaluation was in each case made by four independent persons, without these knowing the allocation of the sheets to the concrete materials. Uniform evaluations were made by all the persons performing the evaluations in all cases. A material is classified as anti-electrostatic in the context of the present invention if, in test 2, it shows only a low or very low attraction of dust and shows no dust figures.

TABLE 1

Compositions and properties

| Example/Components | | | V1* | V2* | 1 | 2 | 3 |
|---|---|---|---|---|---|---|---|
| A.1 | Polycarbonate | | 68.4 | 68.4 | 68.4 | 68.4 | 68.4 |
| B | Graft polymer | | 6.8 | 6.8 | 6.8 | 6.8 | 6.8 |
| C.1 | RDP | | 10.8 | 10.8 | 10.8 | 10.8 | 10.8 |
| D | PTFE preparation (10% PTFE) | | 4.2 | 4.2 | 4.2 | 4.2 | 4.2 |
| E | SAN | | 9.3 | 9.3 | 9.3 | 9.3 | 9.3 |
| G.1 | Stabilizer | | 0.1 | 0.1 | 0.1 | 0.1 | 0.1 |
| G.2 | Mould release agent | | 0.4 | 0.4 | 0.4 | 0.4 | 0.4 |
| H.1 | Antistatic (M = 2,000 g mol$^{-1}$, PO = 51%) | | — | 2.0 | — | — | — |
| H.2 | Antistatic (M = 2,000 g mol$^{-1}$, PO = 100%) | | — | — | 2.0 | — | — |
| H.3 | Antistatic (M = 4,000 g mol$^{-1}$, PO = 70.3%) | | — | — | — | 2.0 | — |
| H.4 | Antistatic (M = 4,000 g mol$^{-1}$, PO = 86.7%) | | — | — | — | — | 2.0 |
| Properties | | | | | | | |
| Vicat B 120 | [° C.] | | 95 | 87 | 89 | 90 | 94 |
| MVR [240° C./5 kg] | [ml/10 min] | | 25 | 38 | 37 | 37 | 37 |
| Antistatic properties (Test 2) | Tendency to attract dust | | high | high | low | low | very low |
| | Dust figures | | yes | yes | no | no | no |

*Comparison experiment

TABLE 2

Compositions and properties

| Example/Components | | V3* | V4* | 4 | 5 | 6 | 7 | V5* |
|---|---|---|---|---|---|---|---|---|
| A.1 | Polycarbonate | 68.4 | 68.4 | 68.4 | 68.4 | 68.4 | 68.4 | 68.4 |
| B | Graft polymer | 6.8 | 6.8 | 6.8 | 6.8 | 6.8 | 6.8 | 6.8 |
| C.1 | RDP | 10.8 | 10.8 | 10.8 | 10.8 | 10.8 | 10.8 | 10.8 |
| D | PTFE preparation (10% PTFE) | 4.2 | 4.2 | 4.2 | 4.2 | 4.2 | 4.2 | 4.2 |
| E | SAN | 9.3 | 9.3 | 9.3 | 9.3 | 9.3 | 9.3 | 9.3 |
| F.1 | Nanoscale AlO(OH) | — | — | 0.7 | — | 0.7 | 0.7 | 0.7 |
| G.1 | Stabilizer | 0.1 | 0.1 | 0.1 | 0.1 | 0.1 | 0.1 | 0.1 |
| G.2 | Mould release agent | 0.4 | 0.4 | 0.4 | 0.4 | 0.4 | 0.4 | 0.4 |
| H.2 | Antistatic (M = 2,000 g mol$^{-1}$, PO = 100%) | — | 3.0 | 3.0 | — | — | — | — |
| H.4 | Antistatic (M = 4,000 g mol$^{-1}$, PO = 86.7%) | — | — | — | 3.0 | 2.0 | 3.0 | 4.0 |
| Properties | | | | | | | | |
| Vicat B 120 | [° C.] | 94 | 87 | 87 | 92 | 92 | 92 | 91 |
| Viscosity [260° C./1000s$^{-1}$) | [Pa s] | 151 | 125 | 127 | 130 | 138 | 131 | 96 |
| a$_k$ (23° C.) | [kJ/m$^2$] | 41 | 41 | 42 | 40 | 45 | 43 | 41 |
| UL94 fire test | Evaluation at 1.6 mm | V-0 | V-2 | V-0 | V-1 | V-1 | V-1 | F |
| Juicing tendency | Weight loss at 280° C. [%] | 1.28 | 1.57 | | 1.27 | | | |
| Antistatic properties (Test 1) | Tendency to attract dust | high | low | low | very low | low | low | very low |
| | Dust figures | yes | no | no | no | no | no | no |
| Antistatic properties (Test 2) | Tendency to attract dust | high | very low | very low | very low | very low | very low | very low |
| | Dust figures | yes | no | no | no | no | no | no |

*Comparison experiment

TABLE 3

Compositions and properties

| Example/Components | | V6* | 8 | 9 | 10 |
|---|---|---|---|---|---|
| A.2 | Polycarbonate | 65.3 | 65.3 | 65.3 | 65.3 |
| B | Graft polymer | 7.0 | 7.0 | 7.0 | 7.0 |
| C.2 | BDP | 14.6 | 14.6 | 14.6 | 14.6 |
| D | PTFE preparation (10% PTFE) | 4.6 | 4.6 | 4.6 | 4.6 |
| E | SAN | 6.0 | 6.0 | 6.0 | 6.0 |
| F.2 | Talc | 2.0 | 2.0 | 2.0 | 2.0 |
| G.1 | Stabilizer | 0.1 | 0.1 | 0.1 | 0.1 |
| G.2 | Mould release agent | 0.4 | 0.4 | 0.4 | 0.4 |
| H.4 | Antistatic (M = 4,000 g mol$^{-1}$, PO = 86.7%) | — | 1.5 | 3.0 | 4.5 |
| Properties | | | | | |
| Vicat B 120 | [° C.] | 95 | 93 | 92 | 90 |
| Viscosity [260° C./1000s$^{-1}$] | [Pa s] | 155 | 139 | 115 | 78 |
| $a_k$ (23° C.) | [kJ/m$^2$] | 18 | 24 | 22 | 20 |
| UL94 fire test | Evaluation at 1.6 mm | V-0 | V-0 | V-0 | V-1 |
| Antistatic properties (Test 1) | Tendency to attract dust | high | high | very low | very low |
| | Dust figures | yes | yes | no | no |
| Antistatic properties (Test 2) | Tendency to attract dust | high | low | very low | very low |
| | Dust figures | yes | no | no | no |

*Comparison experiment

Table 1 shows that by addition of polyalkylene ethers according to the invention based on propylene oxide and ethylene oxide to halogen-free PC/ABS blends which are provided with flame resistance, the tendency of the plastic to attract dust can be significantly reduced (compare comparison example V1 with examples 1–3). As the propylene oxide content increases, at the same molecular weight the antistatic action of the polyalkylene ethers increases (compare examples 2 and 3 and example 1 and comparison example V2). A polyalkylene ether based on ethylene oxide and propylene oxide with a propylene oxide content of only 51% (comparison example 2) is evidently not capable of significantly improving the dust attraction properties of the flame-resistant PC/ABS blend. Suitable polyalkylene ethers are both pure polypropylene oxides (example 1) and those polymers which are based on polypropylene oxide blocks and polyethylene blocks and have the structure of a triple-block copolymer of the general formula X—Y—X, wherein X represents polyethylene oxide blocks and Y represents a polypropylene oxide block (examples 2 and 3). Those modified polyalkylene ethers which have been reacted at elevated temperatures with agents which form free radicals are also suitable as an antistatic (example 1). All the polyalkylene ethers mentioned lead to an improvement in the flowability of the plastic and therefore to an improved processability of the material in the injection moulding process. The use of polyalkylene ethers which are distinguished by a high molecular weight (e.g. at a level of 4,000 g mol$^{-1}$) proves to be advantageous because of the higher heat distortion point and the lower tendency towards juicing (table 2) of the blends provided with anti-electrostatic properties with them. In particular, a high propylene oxide content of the polyalkylene ether employed also proves to be advantageous in respect of the heat distortion point of the blend provided with antistatic properties (cf. examples 2 and 3).

Tables 2 and 3 show that the addition of the polyalkylene ethers suitable as an antistatic does not have an adverse effect on the mechanical properties, such as the notched impact strength. The sometimes adverse influence of the polyalkylene ether on the flame resistance of the material can be at least partly cancelled out by addition of small amounts of inorganic materials, such as e.g. nanoscale AlO(OH) or talc (see e.g. comparison example V3 and V4 and example 4). At very high concentrations of the polyalkylene ether (e.g. ≧4 to 5 wt. %), excellent antistatic properties are indeed observed, but an adequate flame resistance and heat distortion point often (depending on the particular overall recipe) can no longer be realized under these circumstances (comparison example V5).

What is claimed is:

1. A composition comprising 40 to 95 parts by wt. of polycarbonate and/or polyester-carbonate, 1 to 35 parts by wt. of at least one impact modifier, 1 to 30 parts by wt. of at least one phosphorus-containing flameproofing agent selected from the group consisting of oligomeric phosphoric acid esters, phosphazenes and phosphonate-amines and 0.1 to 4 parts by wt. of a polyalkylene ether which is modified with at least one agent which forms free radicals and is based on propylene oxide and ethylene oxide, with a propylene oxide content, based on the polyalkylene ether, of at least 60 wt. %, the molding compositions are characterized in that they pass the UL94V test at a wall thickness of 1.6 mm with V-0 or V-1, said polyalkylene ether having the structure of a triple-block copolymer of the general formula X—Y—X, wherein X represents polyethylene oxide blocks and Y represents a polypropylpne oxide block.

2. The composition of claim 1 wherein the polycarbonate and/or polyester-carbonate is present in an amount of 50 to 90 parts by weight, the at least one impact modifier is present in an amount of 2 to 25 parts by weight, and the at least one phosphorus-containing flameproofing agent is present in an amount of 2 to 20 parts by weight.

3. The composition of claim 1 further containing a fluorinated polyolefin, optionally as a coagulate, precompound or masterbatch with a graft polymer or a vinyl (co)polymer.

4. The composition of claim 1 further containing vinyl (co)polymers, polyalkylene terephthalates or mixtures thereof.

5. The composition of claim 1 further containing an inorganic material in the form of particles, flakes or fibers.

6. Compositions according to claim 5 wherein the inorganic material is talc or a nanoscale material with an average particle diameter of $\leq 200$ nm.

7. The composition of claim 1 wherein the flameproofing agent conform to general formula (IV)

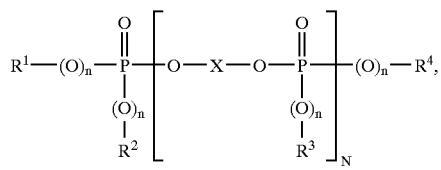

(IV)

wherein $R^1$, $R^2$, $R^3$ and $R^4$ independently of one another in each case denote $C_1$ to $C_8$-alkyl, or $C_5$- to $C_6$-cycloalkyl, $C_6$- to $C_{20}$-aryl or $C_7$- to $C_{12}$-aralkyl, in each case optionally substituted by alkyl, preferably $C_1$–$C_4$-alkyl, n independently of one another, denotes 0 or 1, N denotes a number between 0.5 and 30 and X denotes a mono- or polynuclear aromatic radical having 6 to 30 C atoms or a linear or branched aliphatic radical having 2 to 30 C atoms, which can be OH-substituted and can contain up to 8 ether bonds.

8. The composition of claim 1 wherein the flameproofing agent conform to general formula (V)

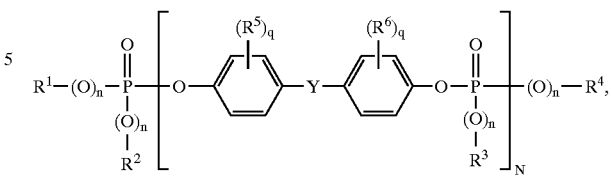

(V)

wherein $R^1$, $R^2$, $R^3$ and $R^4$ in each case independently of one another denote $C_1$–$C_8$-alkyl and/or optionally alkyl-substituted $C_5$–$C_6$-cycloalkyl, $C_6$–$C_{10}$-aryl or $C_7$–$C_{12}$-aralkyl, n independently of one another, denotes 0 or 1, q independently of one another, denotes 0, 1, 2, 3 or 4, N denotes a number between 0.5 and 30, $R^5$ and $R^6$ independently of one another denote $C_1$–$C_4$-alkyl and Y denotes $C_1$–$C_7$-alkylidene, $C_1$–$C_7$-alkylene, $C_5$–$C_{12}$-cycloalkylene, $C_5$–$C_{12}$-cycloalkylidene, —O—, —S—, —SO—, $SO_2$ or —CO—.

9. The composition of claim 1 wherein the flameproofing agent is an oligophosphate based on bisphenol A or resorcinol, of the formula

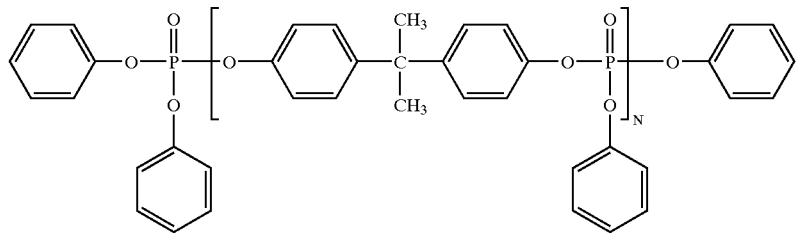

or

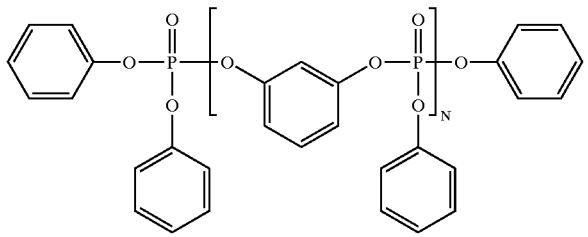

where N is between 0.5 and 10.

10. The composition of claim 1 wherein the impact modifier is a graft polymer of 5 to 95 wt. % of at least one vinyl monomer grafted on 95 to 5 wt. % of at least one graft base with a glass transition temperature of <10° C.

11. Compositions according to claim 10 wherein the graft polymer is based on diene, EP(D)M, acrylate or silicone rubbers.

12. Compositions according to claim 11, comprising an emulsion or bulk ABS or mixtures thereof as the impact modifier.

13. The composition of claim 1 wherein the agent is a member selected from the group consisting of peroxy compound, aliphatic azo compound and araliphatic azo compound.

14. The composition of claim 13 wherein the peroxy compound is a member selected from the group consisting of diacyl peroxide, acylsulfonyl peroxide, peroxydicarbonate, acyl perester, dialkyl peroxide and hydroperoxide.

15. The composition of claim 13 wherein the peroxy compound is a member selected from the group consisting of dibenzoyl peroxide, dilauroyl peroxide, acetylcyclohexanesulfonyl, peroxide dicyclohexyl peroxydicarbonate, di-tert-butyl peroxydicarbonate, tert-butyl perpivalate, tert-butyl perbenzoate, dicumyl peroxide, di-tert-butyl peroxide, cumyl hydroperoxide and tert-butyl hydroperoxide.

16. The composition of claim 1 wherein the agent is a member selected from the group consisting of azodiisobutyronitrile, di-tert-butyl peroxide, dibenzoyl peroxide, tert-butyl perbenzoate, dicumyl peroxide and 1,3-bis-(tert-butylperoxyisopropyl)benzene.

17. The composition of claim 1 wherein the agent is dibenzoyl peroxide.

18. Compositions according to claim 1 in which the polyalkylene ether has a number-average molecular weight of $\geqq 3{,}000$ g mol$^{-1}$.

19. Process for the preparation of the polycarbonate molding composition of claim 1 wherein the individual components are mixed and the mixture is compounded at elevated temperature.

20. A molded article comprising the composition of claim 1.

* * * * *